US008381278B2

(12) United States Patent
Thyagarajan et al.

(10) Patent No.: US 8,381,278 B2
(45) Date of Patent: Feb. 19, 2013

(54) METHOD AND APPARATUS FOR ESTABLISHING SECURITY INFLOW CONTRACTS

(75) Inventors: Sivakumar M. Thyagarajan, Bangalore (IN); Binod Pankajakshy Gangasharan, Bangalore (IN); Ronald M. Monzillo, Lexington, MA (US)

(73) Assignee: Oracle America, Inc., Redwood City, CA (US)

( * ) Notice: Subject to any disclaimer, the term of this patent is extended or adjusted under 35 U.S.C. 154(b) by 1145 days.

(21) Appl. No.: 12/261,793

(22) Filed: Oct. 30, 2008

(65) Prior Publication Data

US 2010/0115595 A1    May 6, 2010

(51) Int. Cl.
*G06F 7/04*    (2006.01)
(52) U.S. Cl. ............... 726/7; 726/5; 726/26; 713/152; 713/168; 713/182
(58) Field of Classification Search .................. None
See application file for complete search history.

(56) References Cited

U.S. PATENT DOCUMENTS

| | | | |
|---|---|---|---|
| 6,922,695 B2 | 7/2005 | Skufca | |
| 7,089,584 B1* | 8/2006 | Sharma | ............................ 726/4 |
| 2003/0097574 A1 | 5/2003 | Upton | |
| 2006/0179125 A1* | 8/2006 | Pavlik et al. | .................. 709/219 |

OTHER PUBLICATIONS

EE Connector Architecture Specification, Chapter 16, Jul. 2008, pp. 1-16.*
Ron Monzillo, "Java Authentication SPI for Containers," JSR-196, Version 1.0, Jul. 9, 2007.
Linda DeMichiel, Sun Microsystems and Michael Keith, Oracle Corporation, "EJB Core Contracts and Requirements," EJB 3.0 Expert Group, JSR 220: Enterprise JavaBeans, Version 3.0, Final Release, May 2, 2006.
Ron Monzillo, "Java Authorization Contract for Containers," JSR-115, Java Community ProcessSM (JCPSM) 2.1, Maintenance Release 4, Version 1.1, Sun Microsystems 2006.
"Generic Inflow Context," Java EE Connector Architecture Specification, Jul. 2008, pp. 11-1 to 11-18.
"Security Inflow," Java EE Connector Architecture Specification, Jul. 2008, pp. 16-1 to 16-24.

* cited by examiner

*Primary Examiner* — Shewaye Gelagay
(74) *Attorney, Agent, or Firm* — Robert C. Kowert; Meyertons, Hood, Kivlin, Kowert & Goetzel, P.C.

(57) ABSTRACT

A method and apparatus for establishing a security inflow contract between a work-initiating system and a work-performing system. A portable, generic security inflow contract between an EIS/connector and an application server is provided that enables the connector to establish security information while submitting a work instance for execution to a work manager and while delivering messages to message endpoints of the application server. The security inflow contract enables all activities of a work instance that is submitted by a connector to be performed in the context of an established identity, thus insuring that all interactions between an application server and an EIS/connector are secure, and may prevent unauthorized access to application components deployed in an application server.

20 Claims, 10 Drawing Sheets

METHOD AND APPARATUS FOR ESTABLISHING SECURITY INFLOW CONTRACTS

BACKGROUND

The Java™ Platform, Enterprise Edition (which may be referred to as Java™ EE or J2EE™) is a widely used platform for server programming in the Java™ programming language. Java™ may be described as a class-based, platform-independent programming language. The Java™ EE platform includes libraries, which provide functionality to deploy distributed, multi-tier Java™ software based largely on modular components running on an application server. Java™ EE is defined by its specification, which includes several Application Programming Interface (API) specifications and defines how to coordinate them.

The Java™ EE Connector Architecture addresses the integration of Java™ technology-based enterprise applications with work-initiating systems such as Enterprise Information Systems (EIS). The Java™ EE Connector Architecture provides a Java™ technology solution to the problem of connectivity between the many application servers and work-initiating systems (e.g., EIS). Examples of Enterprise Information Systems (EIS) include Enterprise Resource Planning (ERP) systems, Customer Relationship Management (CRM) systems, Supply Chain Management business applications and database systems. The connector specification standardizes a set of contracts that enable a connector (also referred to as a resource adapter) between a work-initiating system such as an EIS and an application server to propagate an imported transaction from the EIS to the application server, so that the application server and all related participants can do work as part of the imported transaction. The connector serves as the point of contact between application components, application servers and a work-initiating system such as an EIS. A connector may be viewed as a system-level software driver that is used by a container or an application client to connect to an EIS. A connector is generally specific to a particular EIS.

It is critical, in EIS integration scenarios, that all interactions between an application server and a connector are secure, and that unauthorized access to application components deployed in an application server are prevented. Conventional connectors typically employ transport and message level security for connecting to and receiving messages from an EIS. To achieve end-to-end application security, it is important for security purposes that all activities of a work instance that is submitted by a connector, including delivering messages to a message endpoint, happen in the context of an established identity. Although conventional connectors may employ transport and message level security for connecting to an EIS and receiving messages from an EIS, there has been no standard, portable security inflow contract that enables conventional connectors to deliver application level security while executing a task in a work instance (e.g., one or more tasks executed by an application server) or while delivering a message to a message endpoint (e.g., the boundary between a messaging API and application code). Due to the fact that there has been no standard, portable method for establishing a security inflow contract, connector implementers conventionally have had to adapt their connectors to a variety of proprietary security interfaces in application server environments in which they need or desire to deploy their connectors. In addition, due to the lack of standard contracts to flow-in security context during message delivery in conventional systems, the business logic in message endpoints has been limited to execution in a fixed or unknown security context.

Java™, Java™ EE, J2EE™, and EJB™ as used throughout this document, are trademarks or registered trademarks of Sun Microsystems, Inc. in the United States and other countries.

SUMMARY

Embodiments of a method and apparatus for establishing a security inflow contract between a work-initiating system such as an Enterprise Information system (EIS) and a work-performing system such as an application server are described. Embodiments may provide a portable, generic method for establishing security contracts between EIS/connectors and application servers that enables a connector to establish security information while submitting a work instance for execution to a work manager and while delivering messages to message endpoints residing in the application server. By enabling all activities of a work instance that is submitted by a connector, including delivering messages to a message endpoint, to be performed in the context of an established identity, embodiments may insure that all interactions between an application server and an EIS/connector are secure, and may prevent unauthorized access to application components deployed in an application server.

In one embodiment, a connector receives a message from an EIS. The message may include one or more tasks to be executed on an application server, and principal information, comprising identity information and security attributes. The principal information is associated with the tasks. The connector constructs a work instance and an associated security inflow context. The work instance includes the tasks received in the message, and the security inflow context includes the identity information and security attributes received in the message. The connector sends the work instance with the security inflow context to a work manager on an application server. Subsequently, the application server reads the security inflow context and sends a reference to a callback handler back to the connector. The connector invokes the callback handler to set the security context for the work instance. When the work instance tasks are executed, they are executed in the context of the security context.

In one embodiment, a connector may receive a message from an EIS with a security context. The messaging infrastructure between EIS and connector may be implemented using any suitable messaging technology (e.g., a Java™ Messaging Service implementation integrated with JMS-compatible Message-Oriented Middleware (MoM)). The connector may construct a work instance with a security inflow context. The security inflow context may provide a portable mechanism for a connector to pass security context information to the application server. All activities that happen as part of the work instance, including message deliveries to a message endpoint, may occur in the context of the established identity. In one embodiment, the connector includes an implementation of security inflow context as one of the inflow contexts to be established as the execution context of the work instance. The connector submits the work instance to the work manager of the application server. The connector may schedule work with the work manager for synchronous or asynchronous execution on an application server thread. The work may be performed in a transaction that the connector imports. The work manager may dispatch a free thread and set up an execution context for the work instance. The work manager may find the security inflow context as one of the inflow contexts and invoke the setupSecurityContext( ) method. The connector adds the relevant callbacks (e.g., one or more of CallerPrincipalCallback, GroupPrincipalCallback, and PasswordValidationCallback). The connector then calls a handle( ) method (e.g., CallbackHandler.handle( )). The application server then invokes the callback methods, retrieves the identity information and sets the identity for the work instance according to the identity information. The work manager then invokes a run( ) method to execute the work instance with the established identity. When a message is delivered to the message endpoint by the connector in the context of a work instance, the security context that is set up for that message delivery is inherited from the security context set in the work instance. In other words, as in transaction inflow, all message deliveries that are delivered to endpoints within a single work instance are processed under the same security identity.

Figure 1:
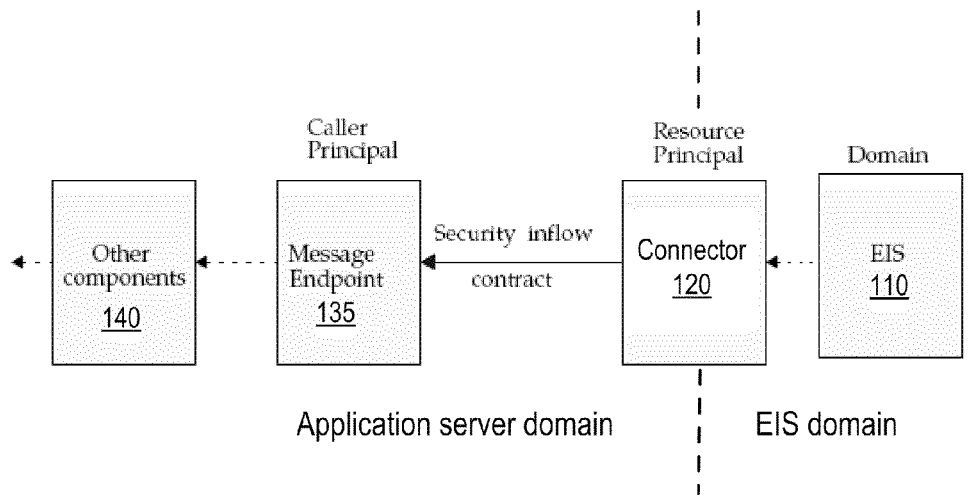
FIG. 1 shows a high-level view of a security inflow contract between an EIS domain and an application server domain, according to one embodiment.

While the system is described herein by way of example for several embodiments and illustrative drawings, those skilled in the art will recognize that the system is not limited to the embodiments or drawings described. It should be understood, that the drawings and detailed description thereto are not intended to limit the system to the particular form disclosed but on the contrary, the intention is to cover all modifications, equivalents and alternatives falling within the spirit and scope of the present system as defined by the appended claims. The headings used herein are for organizational purposes only and are not meant to limit the scope of the description or the claims. As used throughout this application, the word "may" is used in a permissive sense (i.e., meaning having the potential to), rather than the mandatory sense (i.e., meaning must). Similarly, the words, "include", "including", and "includes" mean including, but not limiting to.

DETAILED DESCRIPTION OF THE EMBODIMENTS

Embodiments of a method and apparatus for establishing a security inflow contract between a work-initiating system, such as an Enterprise Information system (EIS), and a work-performing system such as an application server are described. Embodiments may provide a portable, generic security contract between an EIS/connector and an application server that enables the connector (also referred to as a resource adapter) to establish security information while submitting a work instance for execution to a work manager and while delivering messages to message endpoints residing in the application server. Embodiments may be implemented according to a security inflow context model that enables a security context to flow from an EIS to a connector, and on to a work manager or message endpoint; and to affect the message inflow within a work instance, such that work instance tasks are executed within the context of an established identity. By enabling all activities of a work instance that is submitted by a connector, including delivering messages to a message endpoint, to be performed in the context of an established identity, embodiments may insure that all interactions between an application server and an EIS/connector are secure, and may prevent unauthorized access to application components deployed in an application server.

While embodiments of a method and apparatus for establishing a security inflow contract between an EIS and an application server are generally described in relation to Java™ EE environments and the Java™ EE Connector Architecture, it is to be noted that embodiments of the method for establishing a security inflow contract between an EIS and an application server may be adapted for use in other environments or according to other connector or connection architectures; generally speaking, the security inflow context model may be used in or adapted for establishing security contracts between any two servers or between a server and a client according to various connector or connection architectures.

Figure 2:
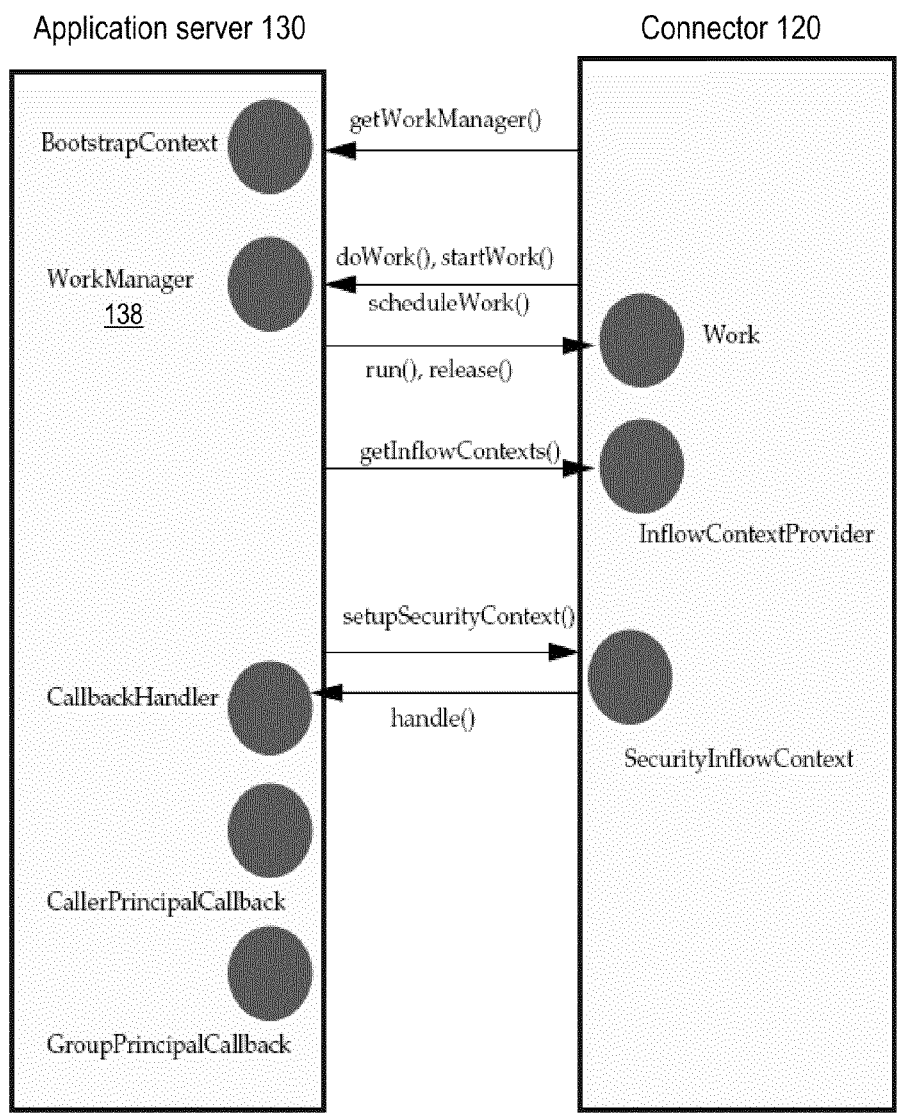
FIG. 2 is an object diagram illustrating security inflow context between a connector instance and an application server instance according to one embodiment

FIG. 1 shows a high-level view of a security inflow contract between an EIS domain and an application server domain, according to one embodiment. Note that, while a connector may be deployed in the application server, the connector may be considered to be in or at the boundary of the application server and EIS domains. FIG. 2 is an object diagram illustrating security inflow context between a connector instance and an application server instance according to one embodiment, and shows various modules, elements, method invocations, and so on related to both the application server instance and the connector instance that may be discussed throughout this document.

Embodiments of a security inflow contract may provide one or more of, but not limited to, the following:

Enabling an end-to-end security model for Java EE applications, to support integration with EIS based on the connector architecture.

Support for the execution of a work instance in the context of an established identity.

Support for the propagation of user information/principal information from an EIS to a message endpoint during message inflow.

Ensuring that the security inflow contract is transparent to an application component provider.

Enabling a work manager to make authorization checks based on the security context information that is provided with a submitted work instance.

Enabling an application component container to authorize and control access during message inflow to message endpoints residing in the application component container.

Allowing message endpoints to be portable across multiple EISs that use different security mechanisms Mapping security identities in foreign domains into corresponding identities in the receiving container or context Ensuring backward compatibility with existing security management contracts, for example as defined for Enterprise Java Beans™ (EJB) for security context inflow to message endpoints realized as Message Driven Beans (MDB).

Security Inflow Model

The following describes a security inflow model that may be implemented by some embodiments, and references elements of FIGS. 1 and 2. Referring to FIG. 1, the connector 120 performs EIS sign-on and secure association with the EIS 110 in an EIS-specific manner. In one embodiment, the security inflow model as described herein does not specify any particular scheme or configuration to perform EIS sign-on and establish such secure associations.

Referring to FIGS. 1 and 2, in one embodiment, the security inflow contract between the connector 110 and the application server 130 may leverage a generic inflow context mechanism by describing a portable inflow context, security inflow context that may be provided by the connector while submitting a work for execution.

Submitting a work instance without specifying the security contextual information, in which the work has to be executed in, may have drawbacks related to application security including one or more of, but not limited to, the following:

When a work instance is submitted by a connector to a work manager for execution:

The work instance is executed in an unknown security context, or a default (fixed) security context set by the application server's work manager.

In the absence of inflow of security identities during work submission, the container cannot ensure the task has been granted fine-grained permissions/access-control based on authenticated user identities but is limited to making access decisions based on code-based identity information.

When a message is delivered asynchronously to message endpoints residing in the application server, the connector cannot establish the security identity of the caller of the message endpoint; for example, when the message endpoint is realized as a Message Driven Bean, the value returned when EJBContext.getCallerPrincipal( ) is called is unknown.

An embodiment of the security inflow contract provides a portable mechanism for the connector 120 to pass security context information to the application server 130. This security inflow context enables an EIS/connector to flow-in security context information while submitting a work to a work manager 138 for execution. All activities that happen as part of the work instance, including message deliveries to message endpoints, may then occur in the context of an established identity, thus avoiding drawbacks such as those listed above and extending the end-to-end security model for applications such as Java™ EE applications to include the work execution and message inflow aspects.

In one embodiment, a connector 120 submits a work instance that implements an inflow context provider method (e.g., InflowContextProvider) to a work manager 138. The connector 120 includes a concrete implementation of a security inflow context as one of the inflow contexts it wants to be established as the execution context of the work instance.

When one of the free threads from the application server's thread pool picks up the work instance for execution, the application server 130 establishes the security context information described in the security inflow context, before executing the work instance.

When a message is delivered to a message endpoint 135 instance by the connector 120 in the context of a work instance, the security context that is set up for that message delivery is inherited from the security context set in the work instance. In other words, all message deliveries that are delivered to endpoints within a single work instance are processed under the same security identity.

When a connector 120 flows-in an identity to be used by the application server 130, the identity may or may not belong to the EIS security domain and the caller principal to be established for a message driven bean (or a message endpoint) is required to be an identity of the application server's security domain. Therefore the EIS integration scenario may have choices related to establishing the caller identity. For example, in one or more embodiments, either of the following example cases related to establishing the caller identity may exist:

Case 1: The connector flows-in an identity in the application server's security policy domain. In this case, in one or more embodiments, the application server may just use the initiating principal, flowed-in from the connector, as the caller principal in the security context the work instance executes as.

Case 2: The connector flows-in an identity belonging to the EIS' security domain. The connector establishes a connection to the EIS and needs to execute a work instance in the context of an EIS identity. In this case, in one or more embodiments, the initiating or caller principal does not exist in the application server's security domain. A translation from one domain to the other needs to be performed.

These cases are further discussed later in this document.

Example Implementation

Figure 3:
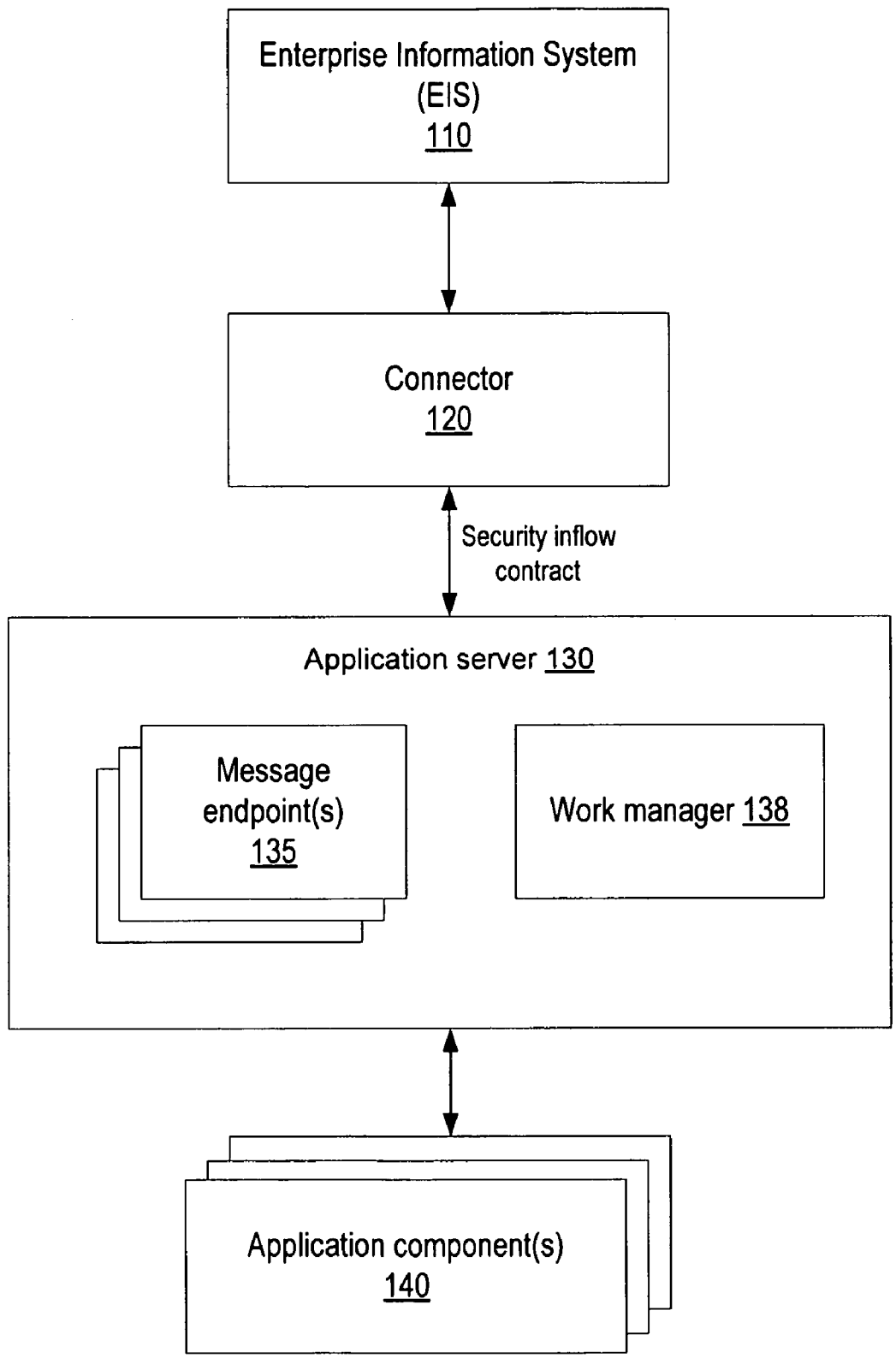
FIG. 3 is a block diagram illustrating a system for implementing a security inflow contract, according to some embodiments.

FIG. 3 is a block diagram illustrating a system for implementing a security inflow contract between a work-initiating system and a work-performing system, according to some embodiments. Enterprise Information System (EIS) 110 is an example of a work-initiating system. An EIS is generally any kind of computing system that is of an enterprise class, meaning the system offers services for private or public organizations, businesses, corporations, government entities, etc. (collectively referred to as enterprises) and that may deal with large volumes of data. EIS 110 may provide a technology platform that enables an enterprise to integrate and coordinate their business processes. A typical EIS may be housed in one or more data centers and run special enterprise software that may include applications (e.g., content management systems) that typically cross organization borders.

Connector 120 serves as the integration point between an EIS 110 and application server 130. Note that a connector may also be referred to as a resource adapter. Application server 130 is an example of a work-performing system. Connector 120 may, for example, be provided by the EIS vendor or provided by a third party vendor. Connector 120 serves as the point of contact between application components 140, application server 130 and EIS 110. Connector 120 may communicate with EIS 110 and application server 130 based on contracts (e.g., various contracts as specified by the Java™ EE Connector Architecture). For example, the contracts may specify how a system external to the Java™ EE platform can integrate with systems within the Java™ EE platform by supporting basic functions that are handled by the Java™ EE container (e.g., application server 130).

For example, a work management contract may enable a connector to do work (e.g., monitor network endpoints, call application components, and so on) by submitting work instances to an application server for execution. The application server dispatches threads to execute submitted work instances. This allows the connector 120 to avoid creating or managing threads directly and allows application server 130 to efficiently pool threads and have control over the run time environment.

As another example, a transaction inflow management contract may enable connector 120 to propagate an imported transaction to application server 130. The message inflow management contract enables connector 120 to asynchronously deliver messages to message endpoints 135 residing in application server 130 independent of the specific messaging style, messaging semantics, and messaging infrastructure used to deliver messages. This contract also serves as the standard message provider pluggability contract that allows a wide range of message providers (e.g., Java™ Message Service (JMS) integrated with JMS compatible Message Oriented Middleware (MoM), Java™ API for XML Messaging (JAXM), and so on) to be plugged into any Java™ EE compatible application server 130 with a connector 120.

Application server 130 may be implemented as any server that hosts an application programming interface (API) to expose business logic and business processes for use by other applications. For example, in some embodiments application server 130 may refer to a Java™ EE application server. Example implementations include WebLogic Server™, JBoss™, WebSphere Application Server™, and Sun GlassFish™ Enterprise Server. Application server 130 may host servlets and JavaServer™ pages, as well as business logic built into Enterprise JavaBeans™ (EJB).

A message endpoint 135 serves as a boundary between the messaging API and application code, such as a message driven bean (MDB) or a web service. Note that the connector contracts may not provide a direct mechanism for a connector to deliver to a web service. However an MDB may call a web service. Embodiments of the methods and apparatus described herein provide a technique for an EIS/connector to flow-in security context information, execute a work instance, and call methods on a message endpoint interface in the context of an established identity. Using an embodiment, all message deliveries that are delivered to multiple message endpoints 135 within a single work instance may be delivered in the context of a single security identity as defined within the security context originating at the EIS.

Work manager 138 resides in application server 130 domain and provides an abstraction from the lower-level APIs that enable an application to access a container-managed thread. Work manager 130 provides a mechanism to join various concurrent work items, so an application can programmatically add the dependency of work completion as a condition for starting other tasks. Work manager 130 receives a work instance and the work instance may include one or more tasks. Work manager 130 may execute work, either synchronously or asynchronously, using application server 130 threads. The transaction inflow support enables the processing to take place in a transaction that connector 120 imports into the server 130.

An application component 140 may be business logic that may be executed as part of a web application, in one embodiment. A web application may be an application accessed via web browser over a network such as the Internet or an intranet. Application component 140 may, for example, be located on a server and is accessible by application server 130. Examples of the business logic include web mail, online retails sales, online auctions, wikis, discussion boards, weblogs, and the like. Note that an application component 140 may be located on application server 130. Note also that application component 140 may be part of other types of applications in other embodiments.

Figure 11:
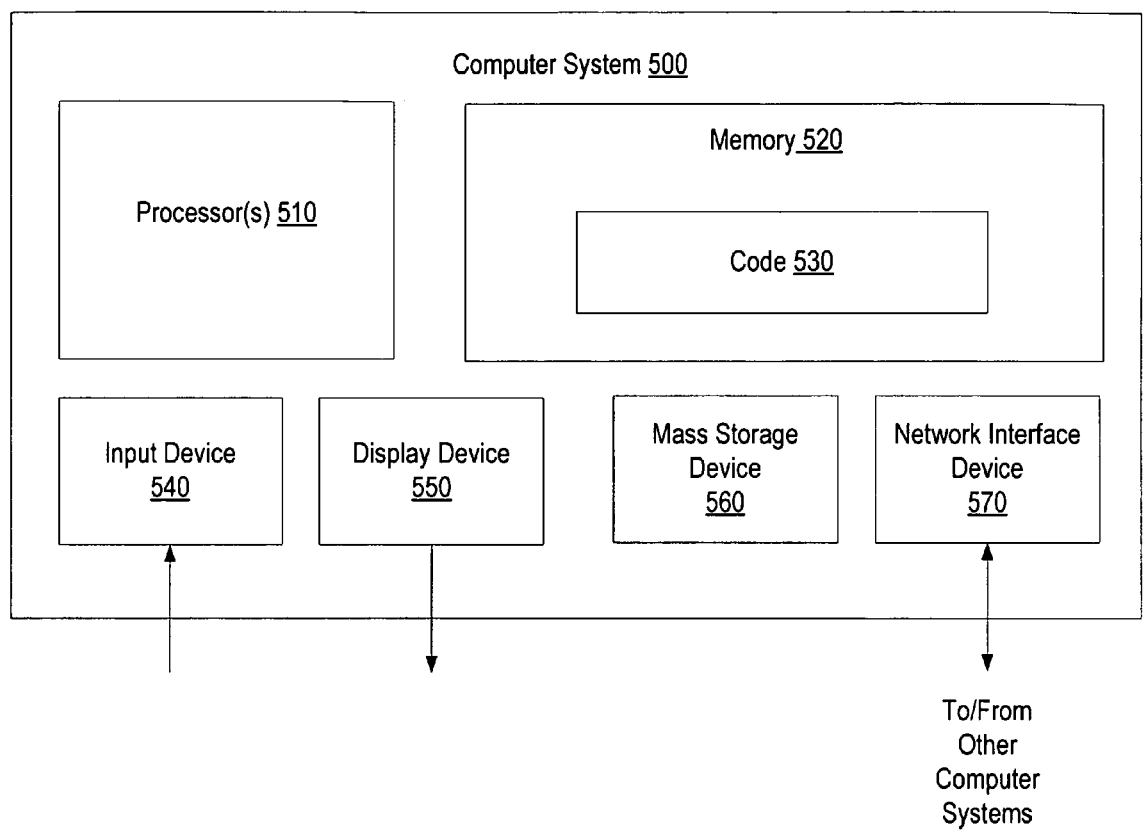
FIG. 11 is a block diagram of a computing device, according to some embodiments.

Some or all elements shown in FIG. 3 may be located on the same physical server or may be on separate physical servers and communicate with one another through a network, such as the Internet or an intranet. FIG. 11 illustrates an example of a computer system on which various elements shown in FIG. 3 and in the other Figures may be implemented. In some embodiments there may be other components not shown in FIG. 3. For example, application server 130 may be connected to one or more backend databases, storage systems, and so on.

A generic inflow context is a technique that enables a connector 120 to provide additional contextual information while a work instance is executed by an application server's work manager 138. In one embodiment, a generic inflow context may be leveraged to define a security inflow context as an inflow context that a connector 120 may use to send a security context while submitting a work instance for execution. In some embodiments, the security inflow context may be implemented as a class which implements an inflow context interface. The following is an example class definition for such a class, and is not intended to be limiting:

```
public abstract class SecurityInflowContext
    Implements InflowContext {
    public String getName( ) {
        return "SecurityInflowContext";
    }
    //...   other methods
    public abstract void setupSecurityContext(
    CallbackHandler handler,
    Subject executionSubject,
    Subject serviceSubject);
}
```

In one embodiment, connector 110 may provide a custom implementation of the SecurityInflowContext abstract class and an implementation for the method setupSecurityContext( ) to setup the security context for the work instance being submitted.

Figure 4:
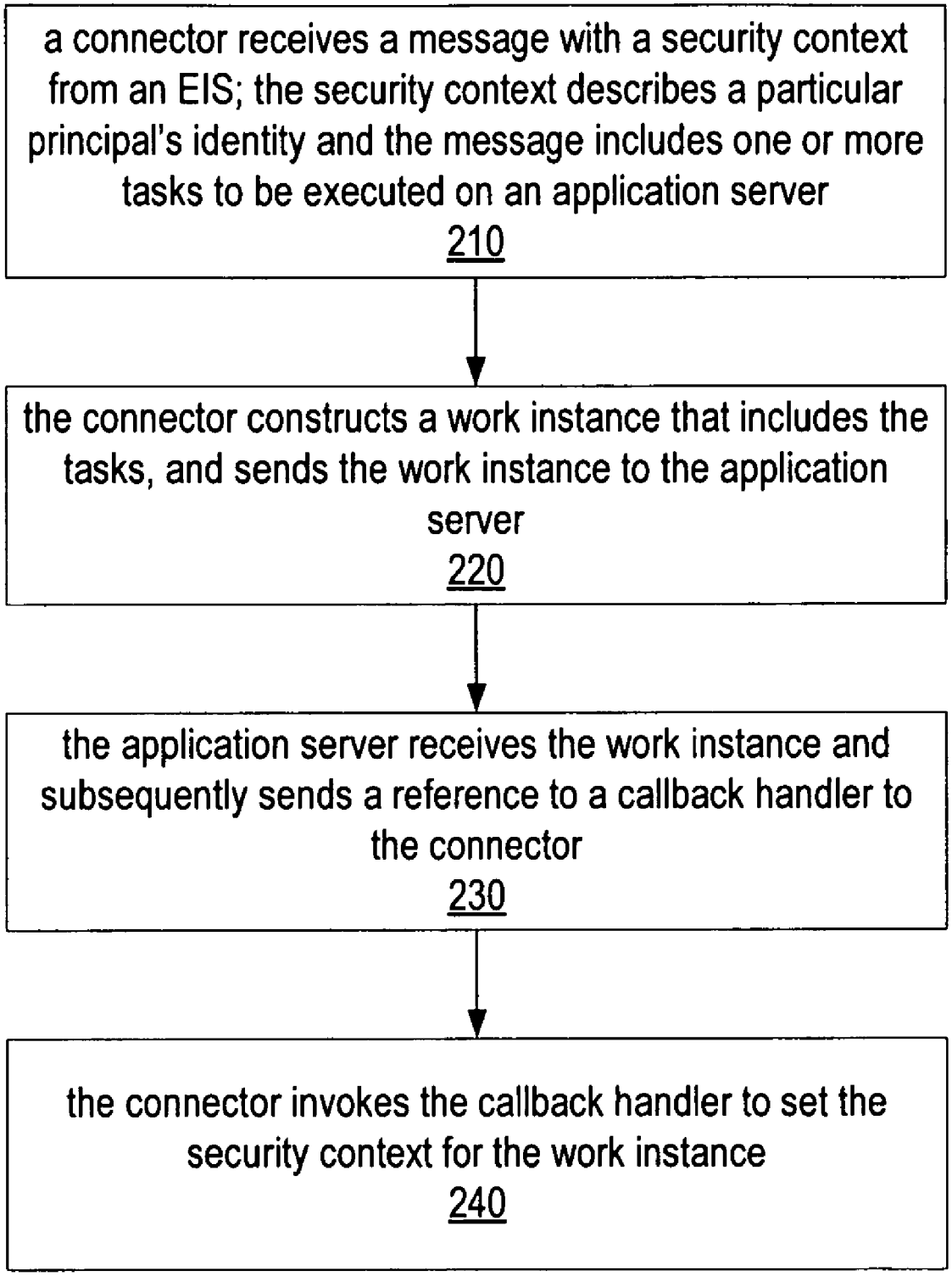
FIG. 4 is a flow diagram illustrating a method for establishing a standard security inflow from a connector to an application server, according to some embodiments.

FIG. 4 is a flow diagram illustrating a method for establishing a standard security inflow from a connector to an application server, according to some embodiments. As indicated at 210, connector 120 may receive a message with a security context from an EIS. The security context may describe a particular principal's identity and the message includes one or more tasks to be executed on an application server 130.

As indicated at 220, connector 120 may construct a work instance that includes or indicates the tasks included in the message from EIS 110. Connector 120 implements an inflow context provider and specifies that the work must be executed within the security context. Connector 120 may schedule the work instance to be executed by application server 130 (e.g., via work manager 138).

As indicated at 230, application server 130 (e.g., work manager 138) receives the work instance. Application server 130 then searches the inflow contexts and finds an inflow context of type security inflow context. Subsequently, the application server 130 sends a reference to a callback handler to the connector. In one embodiment, this may be accomplished by calling the setupSecurityContext( ) method of a SecurityInflowContext object.

As indicated at 240, the connector invokes the callback handler to set the security context for the work instance. In one embodiment, this may be accomplished by invoking the callback handler and sending the callbacks to application server 130. Application server 130 may invoke the callbacks and establish the caller identity.

Figure 5:
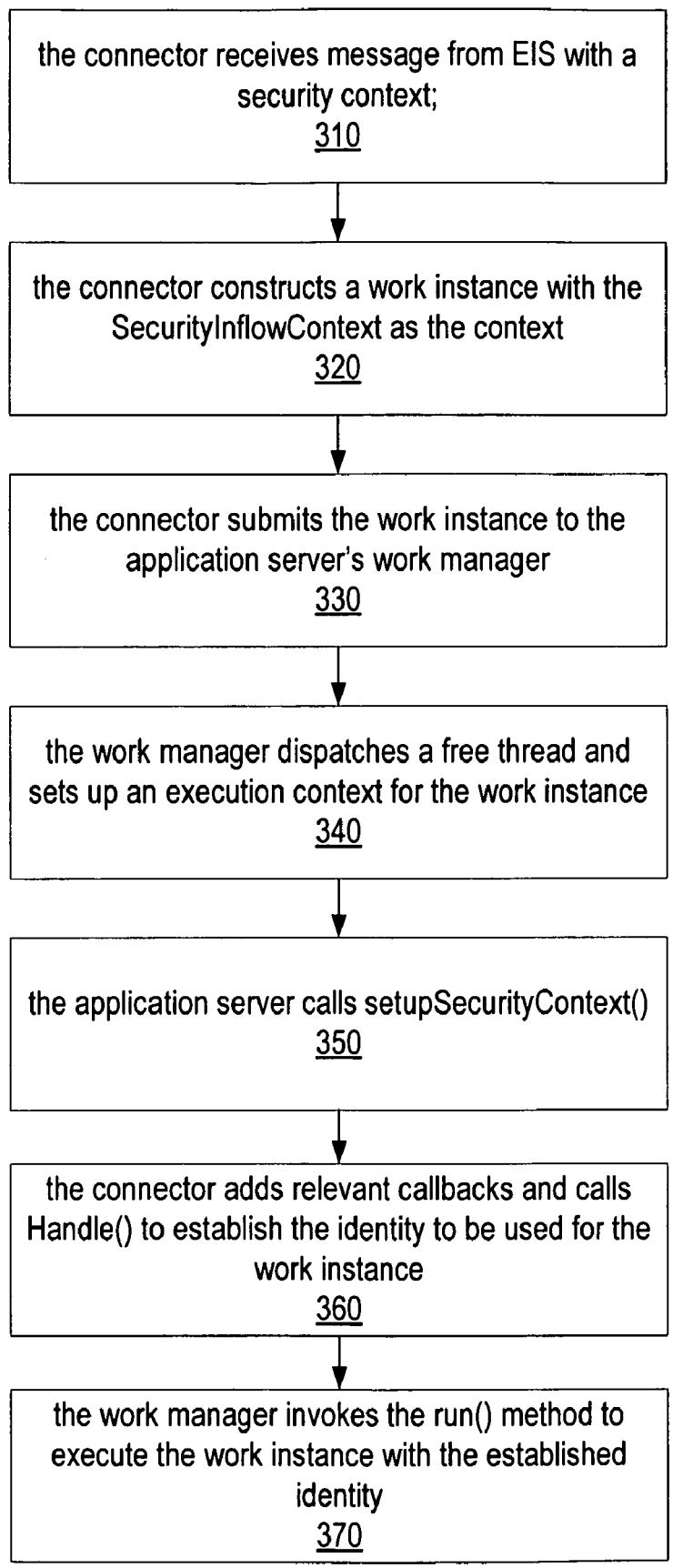
FIG. 5 is a flow diagram illustrating a method and apparatus for creating and executing a work instance with a security context, according to some embodiments.

FIG. 5 is a flow diagram illustrating a method and apparatus for creating and executing a work instance with a security context, according to some embodiments. As indicated at 310, connector 120 may receive a message from an EIS with a security context. The messaging infrastructure between EIS 110 and connector 120 may be implemented using any suitable messaging technology (e.g., a Java™ Messaging Service implementation).

As indicated at 320, connector 110 may construct a work instance with a security inflow context. The security inflow context provides a portable mechanism for connector 120 to pass security context information to application server 130. All activities that happen as part of the work instance, including message deliveries to message endpoint 135 occur in the context of the established identity. Connector 110 includes an implementation of security inflow context as one of the inflow contexts to be established as the execution context of the work instance.

As indicated at 330, connector 110 submits the work instance to the work manager 138 of application server 130. Connector 110 may schedule work with work manager 138 for synchronous or asynchronous execution on an application server 130 thread. The work may be performed in a transaction that connector 110 imports.

As indicated at 340, work manager 138 dispatches a free thread and sets up an execution context for the work instance. Work manager 138 finds the SecurityInflowContext as one of the inflow contexts and invokes the setupSecurityContext( ) method, as indicated at 350. Connector 110 adds the relevant callbacks (e.g., CallerPrincipalCallback, GroupPrincipalCallback, and PasswordValidationCallback). Connector 110 then calls a handle( ) method (e.g., CallbackHandler.handle( )), as indicated at 360. Application server 130 then invokes the callback methods, retrieves the identity information (e.g., see the descriptions of case 1 and case 2 elsewhere herein) and sets the identity for the work instance according to the identity information.

As indicated at 370, work manager 138 then invokes the run( ) method to execute the work instance with the established identity. When a message is delivered to message endpoint 138 by connector 110 in the context of a work instance, the security context that is set up for that message delivery is inherited from the security context set in the work instance. In other words, as in transaction inflow, all message deliveries that are delivered to endpoints within a single work instance are processed under the same security identity.

Figure 6:
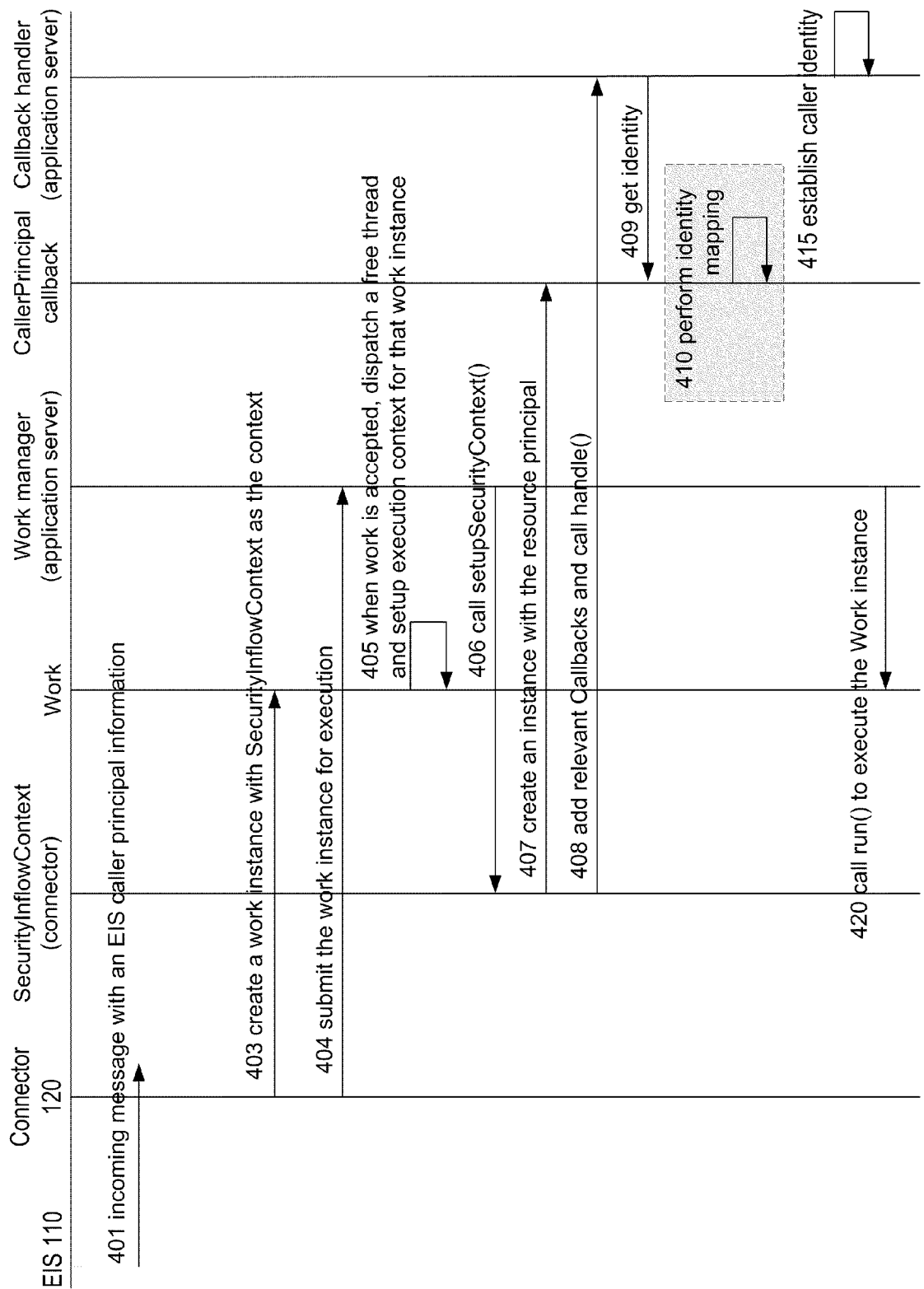
FIG. 6 is a sequence diagram illustrating a method and apparatus for implementing a security inflow contract, according to some embodiments.

FIG. 6 is a sequence diagram illustrating a method and apparatus for implementing a security inflow contract, according to some embodiments. As indicated at 401, connector 120 may receive a message from EIS 110. The message may include one or more tasks to be executed on application server 130 and caller principal information. The caller principal information may include identity information and security attributes.

As indicated at 403, connector 120 may construct a work instance and include a SecurityInflowContext. As indicated at 404, connector 120 may submit the work instance for execution to work manager 130 on application server 130. As indicated at 405, when the work is accepted, the work manager may dispatch a free thread and setup an execution context for the work instance.

Application server 130 may then call setupSecurityContext( ) and pass a reference to a callback handler as an argument, as indicated at 406. Connector 120 may create one or more caller principal callback instances (see element 407) and add any relevant callbacks (see element 408). The callback handler of application server 130 may invoke the callbacks (e.g., CallerPrincipalCallback) to get the identity, as indicated at 409. In the scenario example described above as Case 2, when the callback is invoked, a translation of identities from the EIS security domain to the application security domain may occur. (See shaded area at element 410 of FIG. 6.) In either scenario (e.g., case 1 or case 2) the identity information may be returned to application server 130 and the caller principal may be established, as indicated at 415. The run( ) method of the work instance is then invoked and the tasks included in the work instance are invoked in the context of the security context.

Establishing the Security Context

Figure 7:
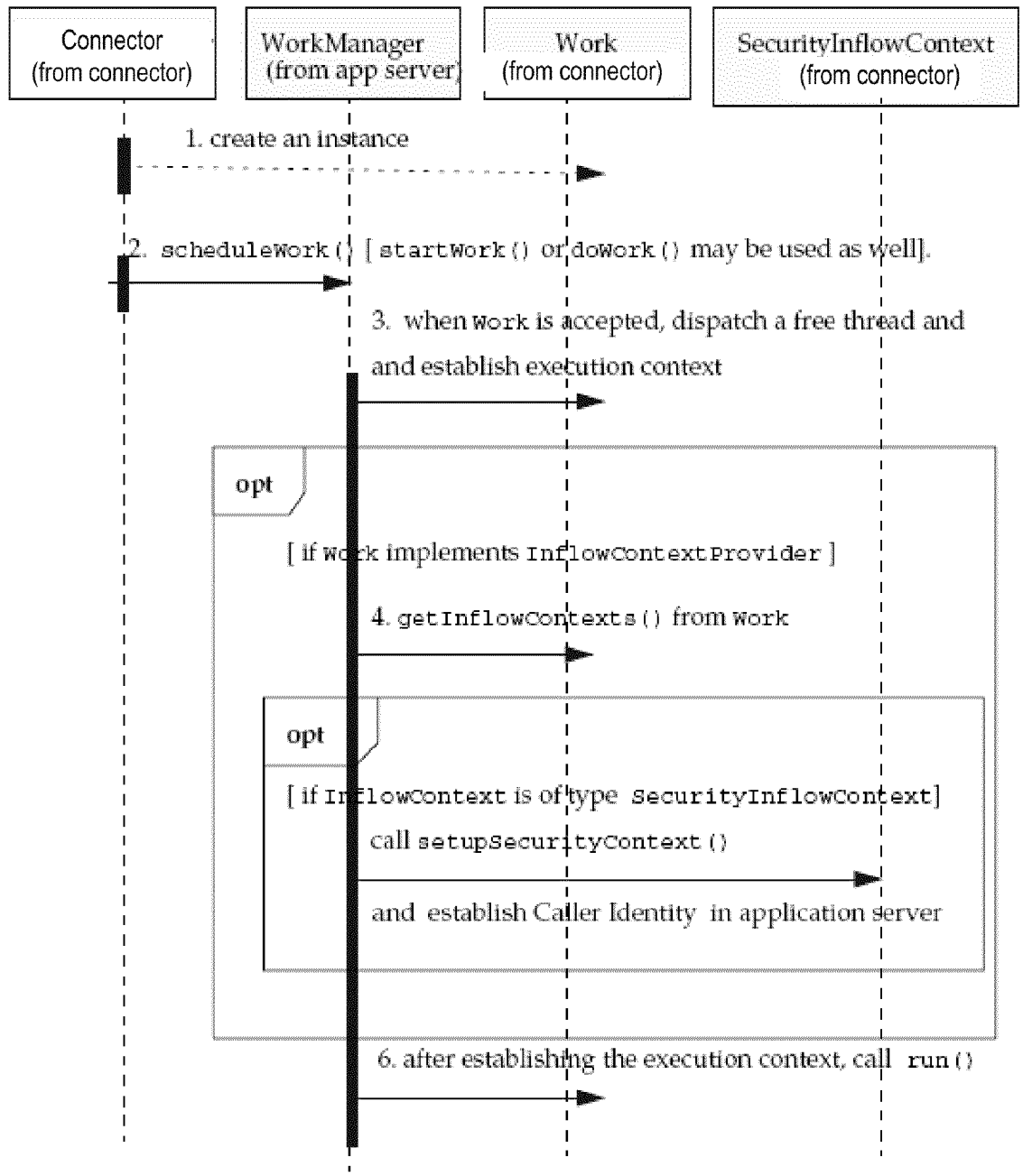
FIG. 7 is a sequence diagram illustrating security context establishment during work submission according to one embodiment.
Figure 8:
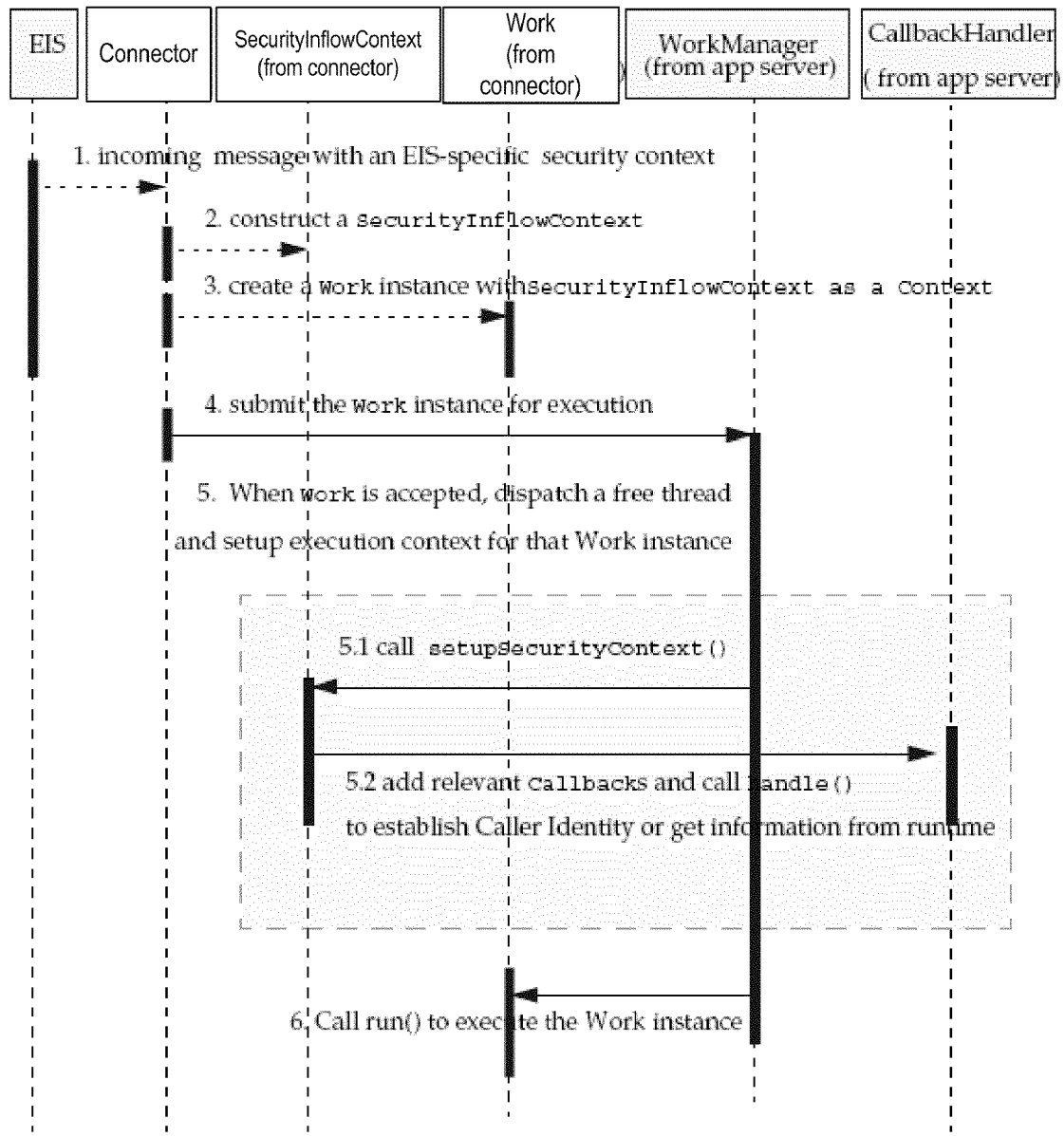
FIG. 8 is another sequence diagram illustrating establishing the security context according to one embodiment.

FIG. 7 is a sequence diagram illustrating security context establishment during work submission according to one embodiment. FIG. 8 is another sequence diagram illustrating establishing the security context according to one embodiment. In one embodiment, connector 120 indicates to work manager 138 that a work instance needs to be run in a specified security execution context by submitting a work instance that implements an inflow context provider method (e.g., InflowContextProvider). Connector 120 ensures that the list of inflow contexts for the work instance contains an instance of SecurityInflowContext. When such a work instance is submitted to work manager 138 for execution, one of the free threads in the thread pooling implementation of application server 130 picks up the work instance for execution. Work manager 138 then obtains the inflow contexts (e.g., through a call to getInflowContexts( )) that need to be set as the execution context(s) for the work instance. Work manager 138 then iterates through the returned list of inflow contexts and sets them up as the execution context for the work instance to execute.

In one embodiment, while setting the execution context of a work instance, the work manager establishes the security context for the work instance when it encounters an InflowContext instance implementing SecurityInflowContext.

In one embodiment, for setting the security context of a work instance, application server 130 may call a setupSecurityContext( ) method of class SecurityInflowContext implementation provided by the connector. In some embodiments, the following conditions may be applicable to the application server provider while calling the setupSecurityContext method.

In one embodiment, the handler argument may not be null. In some embodiments, the callback handler passed to setupSecurityContext( ) may support the following callbacks:

CallerPrincipalCallback—Allows connector 120 to add identity credentials to a work instance/subject. (This identity may be made the caller principal.)

GroupPrincipalCallback—Allows connector 120 to add a group identity to a work instance/subject. (This identity may be made the caller group principal.)

PasswordValidationCallback—Gives connector 120 access to the application server 130 password validation database. Connector 120 can obtain a username/password from a message and use the callback to determine if the username/password is valid in the application server database.

In some embodiments, other callbacks may be supported. For example, one or more of the following callbacks may be supported by a CallbackHandler implementation:

CertStoreCallback
PrivateKeyCallback
SecretKeyCallback
TrustStoreCallback

In one embodiment, the executionSubject argument may not be null and may not be read-only. The connector 120 work implementation may populate the executionSubject with the principals and credentials that may be flowed-in to application server 130.

In one embodiment, the serviceSubject argument may be null. If serviceSubject is not null, it may not be read-only. The serviceSubject is used by the work instance to retrieve principals and credentials necessary to establish a connection to the EIS in the case where mutual authentication is required. The serviceSubject may contain the credentials of the application server or the SecurityInflowContext implementation may collect the service credentials, as necessary, by using the CallbackHandler passed to it.

In one embodiment, when the setupSecurityContext( ) method is called by application server 130, connector 120 may perform one or more of, but not limited to, the following actions to establish caller identity information for a work instance:

- Identify the security context that needs to be flowed-in to application server 130 to serve as the execution context of the work instance.
- Populate the executionSubject with the EIS principals and credentials that it wants to serve as the security context for the work instance to be executed in.
- Add instances of the necessary callbacks to an array and invoke the handle( ) method in the application server's CallbackHandler implementation by passing the array of callback instances.
- On successful return from the CallbackHandler.handle( ) method, the setSecurityContext( ) returns.

In one embodiment, on successful return of setupSecurityContext, the container may use the modified executionSubject (modified as a result of handling the various callbacks) to establish the caller identity of the work instance.

In one embodiment, on successful return from setupSecurityContext, the work manager may ensure that the work is set up to be executed with the established security identity. Any subsequent message endpoint deliveries in that work instance (to message driven beans (MDBs), for instance) should have the security context established appropriately. When MDBs are the message endpoints, MessageDrivenContext.getCallerPrinicipal( ) may return the principal corresponding to the established security identity, and MessageDrivenContext.isCallerInRole( ) may return the result of testing the established security identity for role membership.

Callbacks for Information from the Application Server

In some embodiments, as part of establishing caller identity for a work instance, one or more of the following callbacks may be employed by a connector:

- In one embodiment, a connector may use the CallerPrincipalCallback to set the container's representation of the caller principal. The CallbackHandler may establish the caller principal associated with the invocation being processed by the container. When the argument Principal is null, the handler may establish the container's representation of the unauthenticated caller principal.
- In one embodiment, a connector may use the GroupPrincipalCallback to establish the container's representation of the corresponding group principals within the Subject. When a null value is passed to the groups argument, the handler may establish the container's representation of no group principals within the Subject. Otherwise, the handler's processing of this callback is additive, yielding the union (without duplicates) of the principals existing within the Subject, and those created with the names occurring within the argument array. The CallbackHandler may define the type of the created principals.
- In one embodiment, a connector may use the PasswordValidationCallback to employ the password validation facilities of its containing runtime. Since a connector employing the PasswordValidationCallback makes an assumption of access to the password validation facilities (and thereby access to the security domain), it may be deployed in Case 1 scenarios only. In one embodiment, the connector may pass this information to the deployer through an out-of-band mechanism.

Establishing the Caller Identity

When connector 120 flows-in an identity to be used by application server 130, the identity may or may not belong to the EIS 110 security domain and may or may not belong to the application server 130 security domain. In other words, the EIS security domain and the application security domain may or may not be the same. Therefore the EIS integration scenario may have choices related to establishing the caller identity. In some embodiments identity mapping, translation, or synchronization may need to be performed to determine the correct identity context for executing a work instance. The following describes two case scenario examples related to establishing the caller identity, according to one or more embodiments, and is not intended to be limiting. Note that a container may represent either the application server or an application component container.

Case 1: Connector Provides an Identity in the Container Security Domain

Figure 9:
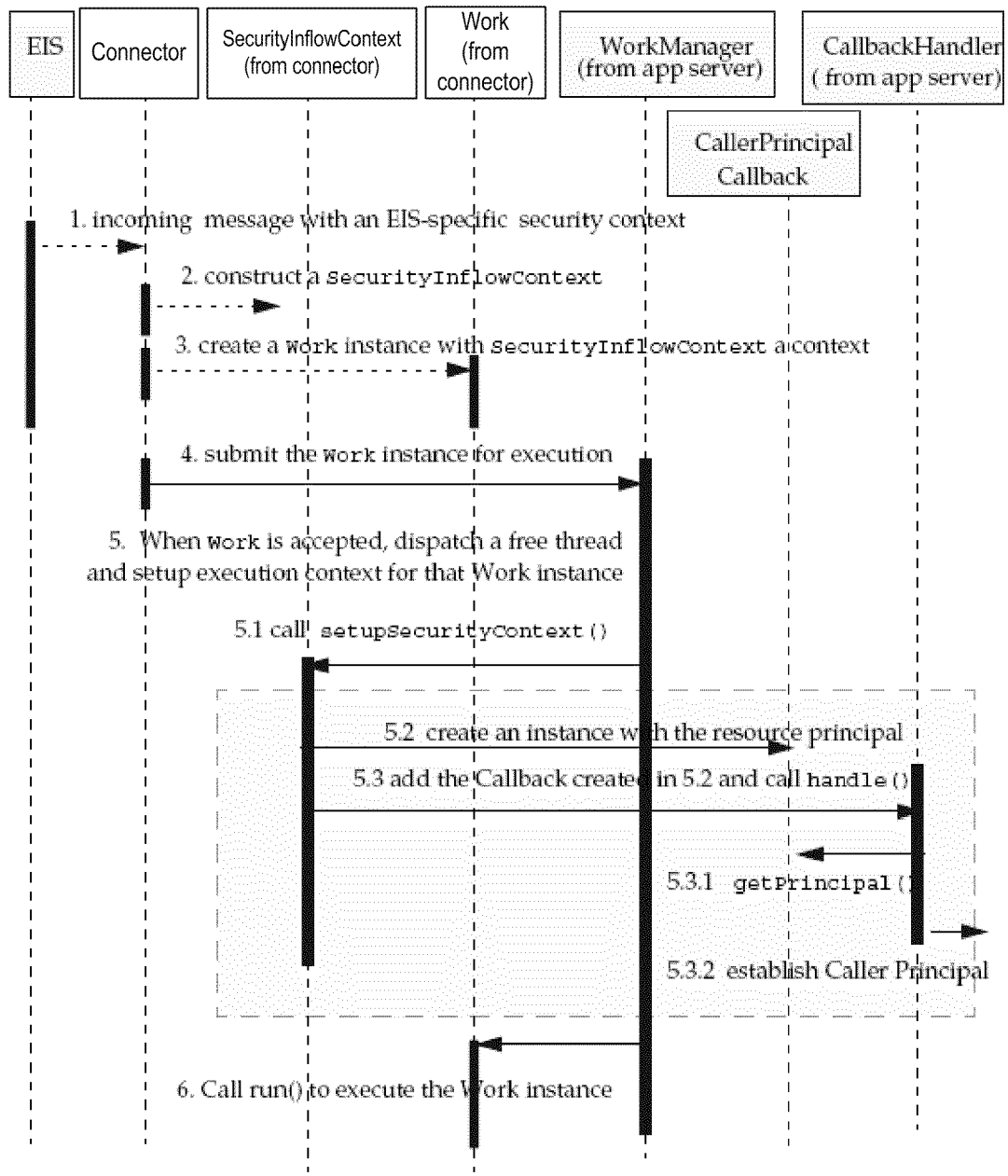
FIG. 9 is a sequence diagram for a case where the connector provides an identity that is in the container's security domain, according to one embodiment.

FIG. 9 is a sequence diagram for case 1 where the connector provides an identity that is in the container's security domain, according to one or more embodiments. The EIS integration scenario may result in the connector reusing the application server security policy domain. In such cases, when the connector flows-in an identity through the security inflow model, the identity already belongs to the application server's security domain. Therefore, the application server may use the Principals used in CallerPrincipalCallback and GroupPrincipalCallback without any translation to the application server security policy domain.

In case 1, according to one or more embodiments, connector 120 flows in an identity in the application server's domain (e.g., application server 130). Application server 130 sets the caller principal (e.g., the security identity under which a message endpoint 135 method is executed) according to the identity flowed-in from connector 120. The caller principal is set to the identity and the work instance is executed using that identity.

As described above, in case 1 connector 120 flows-in an identity that is in the application server 130 security domain. In this case, when setupSecurityContext( ) is invoked, connector 120 may use the CallerPrincipalCallback to set the application server 130 representation of the caller principal. The CallerPrincipalCallback establishes the caller principal associated with the invocation being processed by application server 130. If the caller principal is null, the handler may establish an unauthenticated caller principal.

Connector 120 may use the GroupPrincipalCallback to establish a representation of the group principals included in the Subject. If a null value is passed to the groups argument, the handler may not establish the caller principal as found in the Subject. Otherwise, the handler's processing of this callback is additive, yielding the union (without duplicates) of the principals existing within the Subject, and those created with the names occurring within the argument array. The CallbackHandler will define the type of created principals.

In one embodiment, for case 1 situations, the caller principal may be set by connector 120 through the CallerPrincipalCallback and GroupPrincipalCallback.

On successful return from setupSecurityContext( ), application server 130 may ensure that the work instance is set up to be executed with the established security identity and any subsequent message endpoint 135 deliveries must include the security identity in the work instance.

Case 2: Identity Translated between Security Domains

Figure 10:
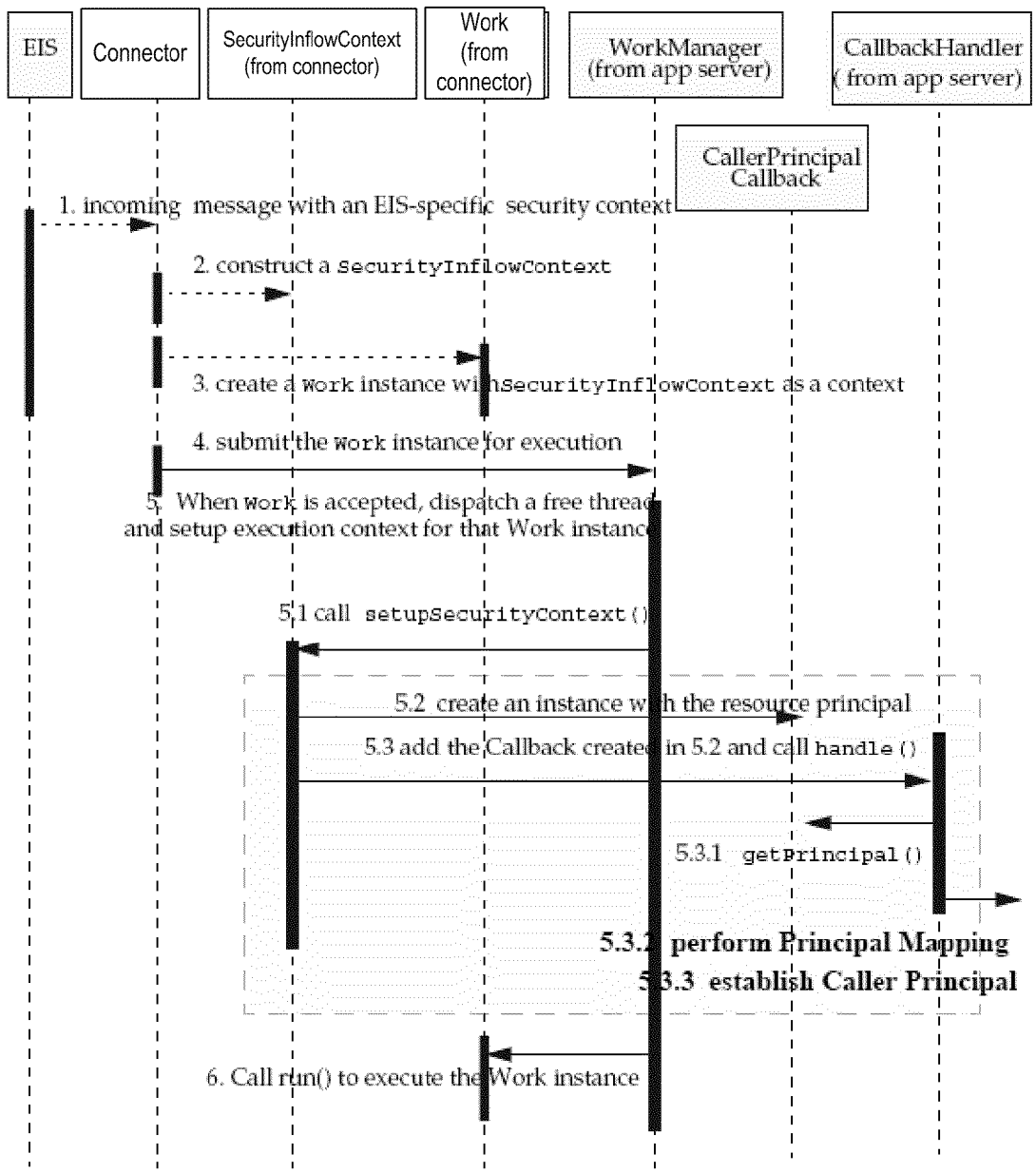
FIG. 10 is a sequence diagram for a case where the identity is translated between security domains, according to one embodiment.

FIG. 10 is a sequence diagram for case 2 where the identity is translated between security domains, according to one or more embodiments. When a connector connects to an EIS that uses a different security policy domain than the container, it requires that the work instance be executed in the context of the container identity mapped from the EIS identity. To handle such a case, the Principals and groups, available in the connector, would need to be mapped to Principals and groups as relevant in the message endpoint container's security policy domain.

In case 2, according to one or more embodiments, connector 120 flows-in an identity belonging to the EIS 110 security domain and the identity does not exist in the application server 130 security domain. In this case a translation may take place. The translation maps an identity in the EIS 110 security domain to an identity in the application server 130 security domain. In one embodiment, a system administrator may be responsible for setting up an identity-map database or translation process when connector 120 is deployed. Any suitable method of mapping one identity to another identity may be used.

In case 2 scenarios, the identity for the work instance may be included in the EIS 110 security domain, but not in the application server 130 security domain. To handle case 2 scenarios, a mapping or translation of EIS 110 identities to application server 130 identities must occur. In this case, when connector 120 is initially installed, an administrator may establish a mapping or translation function. In some embodiments the translation may include certain rules. Thereafter, when a callback is invoked, (e.g., CallerPrincipalCallback) the mapping of the EIS identity to the application server identity occurs at that time. In this scenario, the identity translation is invisible to application server 130. In other words, from the point of view of connector 120, the callback works the same in Case 1 and Case 2 scenarios.

During the inflow of the EIS Subject, the mapping of one or more principals on the path may be required before delivering to the message endpoint or MDB. In one embodiment, these translations from the identity of initiating/caller resource principal to an application server principal may be one of the following types as defined for Java™ EE connectors:

Configured Identity
Principal Mapping
Caller Impersonation
Credentials Mapping

For example, in the case of Principal Mapping, an employee may be identified by a user ID and password (basic authentication) in an EIS. The resource principal may need to be mapped to a Kerberos principal that is relevant in the application server security domain, before delivering the method invocation to the MDB. In the case of message endpoints realized as MDBs, a MessageDrivenContext.getCallerPrincipal method may return the principal that is the result of the mapping and not the original EIS principal. In this example, getCallerPrincipal would return the Kerberos principal.

In one embodiment, the management of the security infrastructure, to enable principal mapping or other schemes listed above, may be performed by the System Administrator role, and the mechanism through which a container enables this mapping is beyond the scope of this document.

In one embodiment, the application server may provide tools to set up Caller Identity information for a work/message endpoint container. This may include support for mapping of LIS/resource principals to Caller Principals in the application server security domain.

In one embodiment, to handle Principal Mapping scenarios described above, the application server may provide a CallbackHandler that can be configured to perform Principal Mapping during its handling of the CallerPrincipalCallback and GroupPrincipalCallbacks. Embodiments may not define interfaces for Principal Mapping service and CallbackHandler configuration. The deployer may use application server-specific tools and techniques to enable this mapping.

In case 2, according to one or more embodiments, connector 120 flows-in an identity belonging to the LIS 110 security domain and the identity does not exist in the application server 130 security domain. In this case a translation may take place. The translation maps an identity in the LIS 110 security domain to an identity in the application server 130 security domain. In one embodiment, a system administrator may be responsible for setting up an identity-map database or translation process when connector 120 is deployed. Any suitable method of mapping one identity to another identity may be used.

In case 2 scenarios, the identity for the work instance may be included in the LIS 110 security domain, but not in the application server 130 security domain. To handle case 2 scenarios, a mapping or translation of LIS 110 identities to application server 130 identities must occur. In this case, when connector 120 is initially installed, an administrator may establish a mapping or translation function. In some embodiments the translation may include certain rules. Thereafter, when a callback is invoked, (e.g., CallerPrincipalCallback) the mapping of the EIS identity to the application server identity occurs at that time. In this scenario, the identity translation is invisible to application server 130. In other words, from the point of view of application server 130, the callback works the same in Case 1 and Case 2 scenarios.

System Example

FIG. 11 is a block diagram of an example of a computing device, according to some embodiments. In various embodiments, computer system 500 may be a uniprocessor system including one processor 510, or a multiprocessor system including several processors 510 (e.g., two, four, eight, or another suitable number). Processors 510 may be any suitable processor capable of executing instructions. For example, in various embodiments, processors 510 may be general-purpose or embedded processors implementing any of a variety of instruction set architectures (ISAs), such as the x86, PowerPC™, Scalable Processor Architecture (SPARC™), or Million Instructions per Second (MIPS™) Instruction Set Architectures (ISAs), or any other suitable ISA. In multiprocessor systems, each of processors 510 may commonly, but not necessarily, implement the same ISA.

System memory 520 is one example of a computer accessible medium that may be configured to store program instructions 530 and/or data accessible by processor 510. In various embodiments, system memory 520 may be implemented using any suitable memory technology, such as static random access memory (SRAM), synchronous dynamic RAM (SDRAM), nonvolatile/Flash-type memory, or any other type of memory. Program instructions and/or data may also be stored, for example, on a hard disk. In the illustrated embodiment, program instructions and data implementing desired functions, such as those described above for implementing enterprise information system 110, connector 120 and application server 130, as well as any of the methods and/or components shown in FIGS. 1 through 10, are shown stored within system memory 520 as program instructions 530 and data storage 560, respectively. In other embodiments, program instructions and/or data may be stored upon different types of computer-accessible media or on similar media separate from system memory 520 or computer system 500. Generally speaking, a computer-accessible medium may include storage media or memory media such as magnetic or optical media, e.g., disk or DVD/CD-ROM, volatile or non-volatile media such as RAM (e.g. Synchronous Dynamic RAM (SDRAM), Double Data Rate RAM (DDR RAM), RAMBUS Dynamic RAM (RDRAM), Static RAM (SRAM), etc.), Read Only Memory (ROM). Program instructions and data stored via a computer-accessible medium may be transmitted by transmission media or signals such as electrical, electromagnetic, or digital signals, which may be provided via a communication medium such as a network and/or a wireless link, such as may be implemented via network interface 570.

Network interface 570 may be configured to allow data to be exchanged between computer system 500 and other devices attached to a network, such as other computer systems, or between nodes of computer system 500. In various embodiments, network interface 570 may support communication via wired or wireless general data networks, such as any suitable type of Ethernet network, for example; via telecommunications/telephony networks such as analog voice networks or digital fiber communications networks; via storage area networks such as Fibre Channel Storage Area Networks (SANs), or via any other suitable type of network and/or protocol.

Input/output devices 540 and 550 respectively, may in some embodiments include one or more display terminals, keyboards, keypads, touchpads, scanning devices, voice or optical recognition devices, or any other devices suitable for entering or retrieving data by one or more computer system 500. Multiple input/output devices 540 and 550 may be present in computer system 500 or may be distributed on various nodes of computer system 500. In some embodiments, similar input/output devices may be separate from computer system 500 and may interact with one or more nodes of computer system 500 through a wired or wireless connection, such as over network interface 570.

Memory 520 may include program instructions 530, configured to implement at least a portion of embodiments of enterprise information system 110, connector 120 and application server 130 as described herein; and data storage 560, comprising various documents, tables, databases, etc. accessible by program instructions 530. In one embodiment, program instructions 530 may include software elements of enterprise information system 110, connector 120 and application server 130 illustrated in the Figures, and data storage 560 may include data used in embodiments of the security inflow context method. In other embodiments, different software elements and data may be included. Program instructions and/or data may be stored, for example, on various types of memory including hard disks.

Those skilled in the art will appreciate that computer system 500 is merely illustrative and is not intended to limit the scope of the system as described herein. In particular, the computer system and devices may include any combination of hardware or software that can perform the indicated functions, including computers, network devices, internet appliances, PDAs, mobile phones, pagers, etc. Computer system 500 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 500 may be transmitted to computer system 500 via transmission media or signals such as electrical, electromagnetic, or digital signals, provided via a communication medium such as a network and/or a wireless link. Various embodiments may further include receiving, sending or storing instructions and/or data implemented in accordance with the foregoing description. Accordingly, the present system may be practiced with other computer system configurations.

The various methods as illustrated in the Figures and described herein represent example embodiments of methods. The methods may be implemented in software, hardware, or a combination thereof. The order of method may be changed, and various elements may be added, reordered, combined, omitted, modified, etc. Additionally, it is intended that any inconsistency in description between this document and any document incorporated within this document be resolved in favor of this document.

Various modifications and changes may be made as would be obvious to a person skilled in the art having the benefit of this disclosure. It is intended that the system embrace all such modifications and changes and, accordingly, the above description to be regarded in an illustrative rather than a restrictive sense.

What is claimed is:

1. A computer-implemented method, comprising:
    establishing a security inflow contract between a work-initiating system and an application server instance, wherein the security inflow contract enables a connector between the work-initiating system and the application server instance to submit work to the application server instance for execution and to deliver messages to message endpoints of the application server instance in the context of a caller identity, wherein said establishing the security inflow contract comprises:
        receiving, from the work-initiating system at the connector between the work-initiating system and the application server instance, an indication of one or more tasks to be performed by the application server instance and caller principal information corresponding to the one or more tasks, wherein the caller principal information includes identity information for a caller principal;
        implementing, by the connector, a security inflow context object for the one or more tasks;

generating, by the connector, a work instance comprising an indication of the one or more tasks, wherein the work instance further indicates the security inflow context object for the one or more tasks;

sending the work instance to the application server instance;

receiving, by the connector from the application server instance, a reference to a callback handler of the application server instance in response to the application server instance detecting the security inflow context object for the one or more tasks and invoking a procedure for providing the callback handler as indicated in the security inflow context object; and invoking, by the connector, one or more callbacks supported by the referenced callback handler to establish, via the callback handler, the caller identity for the work instance on the application server instance according to the caller principal information, wherein the caller identity indicates a security context for the work instance on the application server instance; and performing, by the application server instance, the one or more tasks indicated by the work instance under the established caller identity and within the indicated security context.

2. The computer-implemented method as recited in claim 1, wherein the caller identity is an identity in security domain information of the application server instance.

3. The computer-implemented method as recited in claim 1, wherein the caller identity is an identity in security domain information of the work-initiating system but is not an identity in security domain information of the application server instance, wherein the method further comprises mapping the caller identity from the security domain of the work-initiating system to the security domain of the application server instance.

4. The computer-implemented method as recited in claim 1, wherein said sending the work instance to the application server instance comprises scheduling the work instance with a work manager of the application server instance.

5. The computer-implemented method as recited in claim 1, wherein said sending the work instance to the application server instance comprises sending the work instance to one or more message endpoints of the application server instance.

6. The computer-implemented method as recited in claim 5, wherein at least one message endpoint of the one or more message endpoints is a message driven bean.

7. The computer-implemented method as recited in claim 1, wherein the work-initiating system is an Enterprise Information System (EIS) instance.

8. A system comprising:
at least one processor; and
a memory storing program instructions, wherein the program instructions are executable by the at least one processor to implement an application server configured to establish a security inflow contract with a connector, wherein the security inflow contract enables the connector to submit work to the application server for execution and to deliver messages to message endpoints of the application server in the context of a caller identity, wherein, to establish the security inflow contract, the application server is configured to:
receive a work instance from a connector between a work-initiating system and the application server, wherein the work instance comprises an indication of one or more tasks to be performed by one or more application components provided by the application server, wherein the work instance further specifies a security inflow context object for the one or more tasks;

invoke a procedure indicated in the security inflow context object to send a reference to a callback handler instance on the application server to the connector;

receive, from the connector, invocation of one or more callbacks supported by the callback handler instance, wherein said invocation of the one or more callbacks specifies the caller identity for the work instance on the application server, and wherein the caller identity indicates a security context for the work instance on the application server;

establish the caller identity for the work instance on the application server according to said invocation of the one or more callbacks; and perform the one or more tasks indicated by the work instance under the established caller identity and within the indicated security context.

9. The system as recited in claim 8, wherein the caller identity is an identity in security domain information of the application server.

10. The system as recited in claim 8, wherein the caller identity is an identity in security domain information of the work-initiating system but is not an identity in security domain information of the application server, wherein, to establish a caller identity for the work instance on the application server, the application server is further configured to map the caller identity from the security domain of the work-initiating system to the security domain of the application server.

11. The system as recited in claim 8, wherein, to receive a work instance from a connector between a work-initiating system and the application server, a work manager instance on the application server is configured to receive a scheduling request specifying the work instance from the connector.

12. The system as recited in claim 8, wherein the work instance is received by one or more message endpoints on the application server.

13. The system as recited in claim 12, wherein at least one message endpoint of the one or more message endpoints is a message driven bean.

14. The system as recited in claim 8, wherein the work-initiating system is an Enterprise Information System (EIS) instance.

15. A non-transitory computer-readable storage medium storing program instructions, wherein the program instructions are computer-executable to implement a connector configured to:
establish a security inflow contract with an application server instance, wherein the security inflow contract enables the connector to submit work to the application server instance for execution and to deliver messages to message endpoints of the application server instance in the context of a caller identity, wherein, to establish the security inflow contract, the connector is configured to:
receive, from the work-initiating system, an indication of one or more tasks to be performed by the application server instance and caller principal information corresponding to the one or more tasks, wherein the caller principal information includes identity information for a caller principal;

implement a security inflow context object for the one or more tasks;

generate a work instance comprising an indication of the one or more tasks, wherein the work instance further indicates the security inflow context object for the one or more tasks;

send the work instance to the application server instance;

receive from the application server instance a reference to a callback handler of the application server instance in response to the application server instance detecting the security inflow context object for the one or more tasks and invoking a procedure for providing the callback handler as indicated in the security inflow context object; and invoke one or more callbacks supported by the referenced callback handler to establish, via the callback handler, the caller identity for the work instance on the application server instance according to the caller principal information, wherein the caller identity indicates a security context for the work instance on the application server instance.

16. The non-transitory computer-readable storage medium as recited in claim 15, wherein the application server instance is configured to perform the one or more tasks indicated by the work instance under the established caller identity and according to the specified security inflow context object.

17. The non-transitory computer-readable storage medium as recited in claim 15, wherein the caller identity is an identity in security domain information of the work-initiating system but is not an identity in security domain information of the application server instance, wherein, to establish a caller identity for the work instance on the application server instance according to the caller principal information, the caller identity is mapped from the security domain of the work-initiating system to the security domain of the application server instance.

18. The non-transitory computer-readable storage medium as recited in claim 15, wherein, to send the work instance to the application server instance, the connector is configured to schedule the work instance with a work manager of the application server instance.

19. The non-transitory computer-readable storage medium as recited in claim 15, wherein, to send the work instance to the application server instance, the connector is configured to send the work instance to one or more message endpoints of the application server instance.

20. The non-transitory computer-readable storage medium as recited in claim 15, wherein the work-initiating system is an Enterprise Information System (EIS) instance.

* * * * *